United States Patent
Bae et al.

(10) Patent No.: US 11,690,415 B2
(45) Date of Patent: Jul. 4, 2023

(54) SOFT SENSOR AND MANUFACTURING METHOD THEREFOR, AND HAND-WEARABLE DEVICE HAVING SOFT SENSOR AND MANUFACTURING METHOD THEREFOR

(71) Applicant: FEEL THE SAME, INC., Ulsan (KR)

(72) Inventors: Joon Bum Bae, Ulsan (KR); Su In Kim, Ulsan (KR); Woo Keun Park, Goyang-si (KR); Da Hee Jeong, Ulsan (KR); Jin Hyeok Oh, Ulsan (KR)

(73) Assignee: FEEL THE SAME, INC., Ulsan (KR)

( * ) Notice: Subject to any disclaimer, the term of this patent is extended or adjusted under 35 U.S.C. 154(b) by 824 days.

(21) Appl. No.: 16/609,183

(22) PCT Filed: Dec. 6, 2018

(86) PCT No.: PCT/KR2018/015405
§ 371 (c)(1),
(2) Date: Oct. 28, 2019

(87) PCT Pub. No.: WO2019/143019
PCT Pub. Date: Jul. 25, 2019

(65) Prior Publication Data
US 2020/0093202 A1   Mar. 26, 2020

(30) Foreign Application Priority Data

Jan. 19, 2018   (KR) .................. 10-2018-0007294
Jan. 30, 2018   (KR) .................. 10-2018-0011410
Jan. 30, 2018   (KR) .................. 10-2018-0011411

(51) Int. Cl.
*A41D 19/00*   (2006.01)
*G01L 1/22*    (2006.01)
(Continued)

(52) U.S. Cl.
CPC .......... *A41D 19/0024* (2013.01); *G01L 1/106* (2013.01); *G01L 1/2287* (2013.01); *G01L 5/101* (2013.01); *G06F 3/014* (2013.01)

(58) Field of Classification Search
CPC ....... G01L 1/106; G01L 5/101; G01L 1/2287; G06F 3/014; G06F 3/016; G06F 1/16;
(Continued)

(56) References Cited

U.S. PATENT DOCUMENTS 9,301,563 B2 *   4/2016   Hardy ................ A41D 19/0031
11,301,042 B2 *  4/2022   Bae ........................... G06F 1/16
(Continued)

FOREIGN PATENT DOCUMENTS

CN   104768455      *  7/2015
JP   2006-084354 A     3/2006
(Continued)

OTHER PUBLICATIONS

Jean-Baptiste Chossat et al. "Wearable soft artificial skin for hand motion detection with embedded microfluidic strain sensing", 2015 IEEE International Conference on Robotics and Automation (ICRA), Jun. 2015, Seattle, Washington.
(Continued)

*Primary Examiner* — Octavia Davis Hollington
(74) *Attorney, Agent, or Firm* — NKL Law; Jae Youn Kim

(57) ABSTRACT

A soft sensor includes an elastic sheet, which includes a first elastic layer and a second elastic layer facing each other, and a sensor unit formed by printing a predetermined conductive liquid metal between the first elastic layer and the second elastic layer. A hand-wearable device may include at least one soft sensor, wherein the hand-wearable device has a shape corresponding to at least a portion of a shape of a
(Continued)

hand, and the soft sensor is located at a position corresponding to at least some joints of the hand.

8 Claims, 11 Drawing Sheets

(51) Int. Cl.
*G06F 3/01* (2006.01)
*G01L 1/10* (2006.01)
*G01L 5/101* (2020.01)

(58) Field of Classification Search
CPC .............. A41D 1/005; A41D 19/0024; A41D 19/0027; G01B 7/16; G01D 5/12; H01B 1/02; H01B 13/008; H01B 7/06; H01B 7/08
USPC ........................................................ 702/150
See application file for complete search history.

(56) References Cited

U.S. PATENT DOCUMENTS

| | | | |
|---|---|---|---|
| 11,412,793 B2* | 8/2022 | Bae | .......................... G06F 3/014 |
| 2006/0097373 A1 | 5/2006 | Ito | |
| 2014/0215684 A1 | 8/2014 | Hardy et al. | |
| 2015/0331533 A1 | 11/2015 | McMillen | |
| 2016/0070347 A1 | 3/2016 | McMillen et al. | |
| 2016/0290880 A1 | 10/2016 | Lewis et al. | |
| 2017/0303853 A1 | 10/2017 | McMillen et al. | |
| 2022/0244032 A1* | 8/2022 | Connor | .................... G01B 7/18 |

FOREIGN PATENT DOCUMENTS

| | | | |
|---|---|---|---|
| JP | 2016080675 A | | 5/2016 |
| JP | 2017041375 A | | 2/2017 |
| JP | 2017-152687 A | | 8/2017 |
| KR | 1020060025796 A | | 1/2007 |
| KR | 10-2015-0000147 A | | 1/2015 |
| KR | 10-2015-0004819 A | | 1/2015 |
| KR | 10-2015-0044084 A | | 4/2015 |
| KR | 101543628 B1 | | 8/2015 |
| KR | 10-2017-0006817 A | | 1/2017 |
| KR | 20170006817 | * | 1/2017 |
| KR | 10-2017-0140515 A | | 12/2017 |
| KR | 20180102412 A | * | 9/2018 |
| WO | 2013/149181 A1 | | 10/2013 |

OTHER PUBLICATIONS

Xuelin Wang et al., "Recent Advancements in Liquid Metal Flexible Printed Electronics: Properties, Technologies, and Applications" Department of Biomedical Engineering, School of Medicine, Tsinghua University, Sep. 26, 2016, Beijing, China.

* cited by examiner

SOFT SENSOR AND MANUFACTURING METHOD THEREFOR, AND HAND-WEARABLE DEVICE HAVING SOFT SENSOR AND MANUFACTURING METHOD THEREFOR

TECHNICAL FIELD

One or more embodiments relate to a soft sensor, a method of manufacturing the same, a hand-wearable device having the soft sensor, and a method of manufacturing the hand-wearable device.

BACKGROUND ART

Recently, attention has been drawn to a hand-wearable device worn on a hand for interacting with a virtual object by transmitting a force generated from the virtual object in virtual reality to a finger.

Accordingly, the analysis of hand movements should precede and studies should be conducted to measure hand movements more easily while a hand-wearable device is worn.

The soft sensor may include an electrode made of a conductive material having elasticity and flexibility. The soft sensor may be a sensor having elasticity and flexibility and capable of measuring displacement or force. Recently, as fields of application of wearable devices, etc. expand, the demand for soft sensors having elasticity and flexibility is increasing.

DESCRIPTION OF EMBODIMENTS

Technical Problem

The present disclosure provides a soft sensor which is easy to manufacture and has improved performance, a method of manufacturing the soft sensor, a hand-wearable device having the soft sensor, and a method of manufacturing the hand-wearable device.

Solution to Problem

One and more embodiments include a soft sensor including an elastic sheet including a first elastic layer and a second elastic layer facing each other; and a sensor unit formed by printing a predetermined conductive liquid metal between the first elastic layer and the second elastic layer.

In addition, one and more embodiments include a hand-wearable device including at least one soft sensor described above, wherein the hand-wearable device has a shape corresponding to at least a portion of a shape of a hand, and the at least one soft sensor is located at a position corresponding to at least some joints of the hand.

One and more embodiments include a method of manufacturing a soft sensor, the method including forming a first elastic layer on a base substrate; forming a sensor unit by printing a conductive liquid metal on the first elastic layer in a predetermined pattern; and forming a second elastic layer on the first elastic layer on which the conductive liquid metal is printed.

One and more embodiments include a method of manufacturing a hand-wearable device, the method including forming a first elastic layer on a base substrate; forming a sensor unit by printing a conductive liquid metal on the first elastic layer in a predetermined pattern; forming a second elastic layer on the first elastic layer on which the conductive liquid metal is printed; and cutting a remaining portion of the first elastic layer and second elastic layer except for a portion in which the sensor unit is formed into a shape suitable for a wearing portion.

One or more embodiments include a soft sensor including an elastic sheet including a first elastic layer including a first elastic material and a third elastic layer facing the first elastic layer and including a second elastic material different from the first elastic material, and a sensor unit formed by printing a predetermined conductive liquid metal between the first elastic layer and the third elastic layer.

Herein, a second elastic layer may be further included between the first elastic layer and the third elastic layer.

Herein, the sensor unit may be formed by printing the conductive liquid metal between the second elastic layer and the third elastic layer.

Herein, the second elastic layer may include the second elastic material same as the third elastic layer.

Herein, a fourth elastic layer formed on a side surface opposite to a surface in contact with the second elastic layer may be further included in the third elastic layer.

Herein, the fourth elastic layer may include the first elastic material same as the first elastic layer.

Herein, the fourth elastic layer may include a material having a lower adhesiveness than the first elastic layer.

Herein, the fourth elastic layer may be formed as an opaque layer mixed with a predetermined silicone pigment.

Herein, the first elastic material may have a higher elasticity than the second elastic material.

Herein, the second elastic material may have a higher hardness than the first elastic material.

Herein, the first elastic material may have a high adhesiveness than the second elastic material.

Herein, at least a portion of the first elastic layer may have a material having a higher adhesiveness than a remaining portion of the first elastic layer.

Herein, at least a portion of the elastic sheet may be formed as an opaque layer mixed with a predetermined silicone pigment.

In addition, one or more embodiments include a method of manufacturing a soft sensor, the method including forming a first elastic layer including a first elastic material on a base substrate; forming a second elastic layer including a second elastic material different from the first elastic material on the first elastic layer; forming a sensor unit by printing a predetermined conductive liquid metal on the second elastic layer in a predetermined pattern' and forming a third elastic layer including the second elastic material on the second elastic layer on which the conductive liquid metal is printed.

Herein, the method may further include forming a fourth elastic layer on the third elastic layer after forming the third elastic layer.

Herein, the fourth elastic layer may include the first elastic material same as the first elastic layer.

Herein, the fourth elastic layer may include a material having a lower adhesiveness than the first elastic layer.

Herein, the first elastic material may have a higher elasticity than the second elastic material.

Herein, the second elastic material may have a higher hardness than the first elastic material.

Herein, the first elastic material may have a high adhesiveness than the second elastic material.

One or more embodiments include a finger movement measuring device, the device including a thumb sensing unit covering at least a portion of a user's thumb and including at least one soft sensor; an index finger sensing unit covering at least a portion of the user's index finger and including at least one soft sensor; a middle finger sensing unit covering at least a portion of the user's middle finger and including at least one soft sensor; a first adduction/abduction measuring sensor between the thumb sensing unit and the index finger sensing unit, and a second adduction/abduction measuring sensor between the index finger sensing unit and the middle finger sensing unit.

Herein, the thumb sensing unit may include a first thumb portion sensor covering at least a portion of the distal phalanx and proximal phalanx of the thumb and measuring the bending and stretching between the distal phalanx and proximal phalanx of the thumb; a second thumb portion sensor covering at least a portion of the proximal phalanx and metacarpals of the index finger and measuring the bending and stretching between the proximal phalanx and metacarpals of the thumb; and a third thumb portion sensor covering at least a portion of the metacarpals and carpals of the thumb and measuring the bending and stretching between the metacarpals and carpals of the thumb.

Herein, the index finger sensing unit may include a first index finger portion sensor covering at least a portion of the middle phalanx and proximal phalanx of the index finger and measuring the bending and stretching between the middle phalanx and proximal phalanx of the index finger, and a second index finger portion sensor covering at least a portion of the proximal phalanx and metacarpals of the index finger and measuring the bending and stretching between the proximal phalanx and metacarpals of the index finger.

Herein, the middle finger sensing unit may include a first middle finger portion sensor covering at least a portion of the middle phalanx and proximal phalanx of the middle finger and measuring a bending and stretching between the middle phalanx and proximal phalanx of middle finger, and a second middle finger portion sensor covering at least a portion of the proximal phalanx and metacarpals of the middle finger and measuring the bending and stretching between the proximal phalanx and metacarpals of the middle finger.

Herein, the first adduction/abduction measuring sensor may be between the thumb sensing unit and the index finger sensing unit and measure the adduction and abduction of the thumb.

Herein, the second adduction/abduction measuring sensor may be between the index finger sensing unit and the middle finger sensing unit and measure the adduction and abduction of the index finger or the middle finger.

A third adduction/abduction measuring sensor may be further included on a side of the index finger sensing unit.

The third adduction/abduction measuring sensor may be between the index finger sensing unit and the middle finger sensing unit and measure the adduction and abduction of the index finger.

Herein, each of the soft sensors may include an elastic sheet including a first elastic layer and a second elastic layer facing each other, and a soft sensor formed by printing a predetermined conductive liquid metal between the first elastic layer and the second elastic layer.

Herein, the elastic sheet may be formed in a shape corresponding to at least a portion of a shape of a hand, and the at least one sensor may be located at a position corresponding to at least some joints of the hand.

Advantageous Effects of Disclosure

According to the soft sensor, the method of manufacturing the soft sensor, the hand-wearable device having the soft sensor, and the method of manufacturing the hand-wearable device of the present disclosure, the manufacturing of the soft sensor and the hand-wearable device are easy and performance thereof are improved.

BEST MODE

Figure 1:
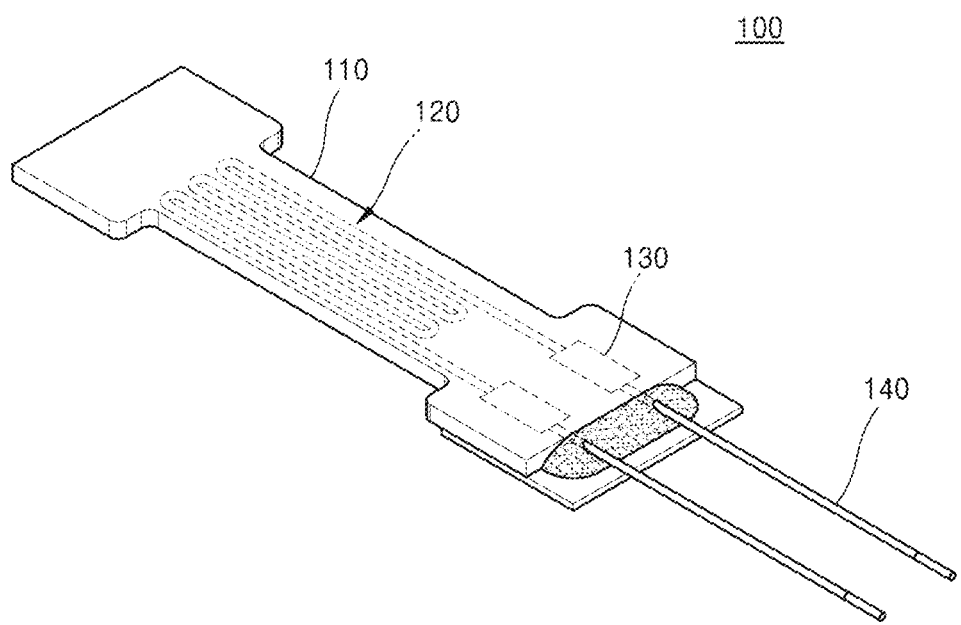
FIG. 1 is a perspective view of a soft sensor according to an embodiment.

As the present disclosure allows for various changes and numerous embodiments, particular embodiments will be illustrated in the drawings and described in detail in the written description. However, this is not intended to limit the inventive concept to particular modes of practice, and it is to be appreciated that all changes, equivalents, and substitutes that do not depart from the spirit and technical scope are encompassed in the inventive concept. In the description, certain detailed explanations of the related art are omitted when it is deemed that they may unnecessarily obscure the essence of the inventive concept.

While such terms as "first," "second," etc., may be used to describe various elements, such elements must not be limited to the above terms. The above terms are used only to distinguish one element from another.

The terms used in the present specification are merely used to describe particular embodiments, and are not intended to limit the inventive concept. An expression used in the singular encompasses the expression of the plural, unless it has a clearly different meaning in the context. In the present specification, it is to be understood that the terms such as "including," "having," and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Hereinafter, the inventive concept will be described more fully with reference to the accompanying drawings, in which exemplary embodiments of the inventive concept are shown. This inventive concept may, however, be embodied in many different forms and should not be construed as being limited to the exemplary embodiments set forth herein.

In addition, in describing various embodiments of the inventive concept, each embodiment should not be interpreted or implemented independently. It should be understood that the inventive concepts described in each embodiment can be interpreted or implemented in combination with other embodiments separately described.

Hereinafter, embodiments of the present disclosure will now be described with reference to the accompanying drawings.

FIG. 1 is a perspective view of a soft sensor according to an embodiment.

Referring to FIG. 1, a soft sensor 100 according to an embodiment may include an elastic sheet 110, a sensor unit 120, a connection unit 130, and a wire unit 140.

Herein, the soft sensor of an embodiment may be used to measure an angle of a joint in a field of virtual reality, coexistence reality or rehabilitation. In particular, the soft sensor of an embodiment may be used as a unit configured to measure an angle of a finger joint to input data to a virtual reality device or the like.

In detail, the elastic sheet 110 includes a first elastic layer 111 and a second elastic layer 112. The first elastic layer 111 and the second elastic layer 112 may be formed separately and have a stacked structure in a vertical direction. Herein, although the elastic sheet 110 is shown as including two layers of the first elastic layer 111 and the second elastic layer 112, the inventive concept is not limited thereto. The elastic sheet 110 may include two or more layers of various materials when needed. The elastic sheet 110 will be described in more detail below.

The first elastic layer 111 is a layer formed by coating with a first elastic material. The first elastic material may be a non-conductive material having elasticity and flexibility. Herein, although the first elastic material is described as using, for example, silicon, the inventive concept is not limited thereto. As described above, the first elastic layer 111 may be formed by coating the first elastic material on a base substrate (see 101 in FIG. 5A) by various methods such as spin coating, silicon coating (squeegeeing), compression molding, printing, or the like.

The second elastic layer 112 is a layer formed by coating with a second elastic material. The second elastic material may be a non-conductive material having elasticity and flexibility. The second elastic material may use a material having a surface tension less than that of a conductive liquid metal (see 121 of FIG. 5B) forming the sensor unit 120. In an embodiment, for example, as the second elastic material uses silicon, the first elastic material and the second elastic material are described as the same material, but the inventive concept is not limited thereto. Herein, when the first elastic material and the second elastic material use the same silicon, the silicon may be formed as a monolithic sheet. However, the inventive concept is not limited thereto. The second elastic material may use any material as a material has a surface tension less than the conductive liquid metal 121 and has elasticity and flexibility. As described above, the second elastic layer 112 may be formed by coating the second elastic material on the first elastic layer 111 (and the sensor unit 120 on the first elastic layer 111) by various methods such as spin coating, silicon coating (squeegeeing), compression molding, printing, or the like.

The sensor unit 120 may be formed between the first elastic layer 111 and the second elastic layer 112. Herein, the sensor unit 120 may be formed on the first elastic layer 111 in a predetermined pattern by using the conductive liquid metal (see 121 of FIG. 5B). As described above, the sensor unit 120 may be formed by using various methods such as 3D printing, nozzle printing, inkjet printing, roll-to-roll printing, or the like.

The sensor unit 120 may include a predetermined conductive material and may include a conductive material in a liquid or solid form which is capable to be coated. In an embodiment, the sensor unit 120 may include a conductive liquid metal that maintains a liquid state at room temperature and has conductivity. Herein, the conductive liquid metal is described as using eutectic gallium-indium (EGaIn) as an example.

The EGaIn is also referred to as eutectic gallium-indium composite. The EGaIn may include 75.5 wt % of gallium (Ga) and 24.5 wt % of indium (In). The EGaIn may be dissolved at about 15.7° C. and maintain a liquid state at room temperature. In addition, the EGaIn has a conductivity level of $3.4 \times 10^4$ S/cm, which is very high conductivity. In addition, the EGaIn is low in viscosity and flows well, and has high surface tension due to an oxide film on the surface thereof. Since the EGaIn has a high surface tension, it is easy to form micro channels as the EGaIn maintains a shape when 3D printing in a desired pattern. In addition, it is possible to print the EGaIn directly in a desired pattern by injection through a syringe coupled to a CNC facility, without any chemical treatment.

As described above, as the sensor unit 120 includes the conductive liquid metal, the sensor unit 120 may have sufficient elasticity.

Positions of the soft sensor may be provided on a joint portion of each finger of a surface of the hand-wearable device and between a thumb and an index finger and the soft sensor provided between the thumb and the index finger may be configured to detect movements of adduction and abduction of the thumb.

In addition, the soft sensor provided in the joint portion of each finger may include both of a sensor measuring bending and stretching movements and a sensor measuring the adduction and abduction movements.

Alternatively, the soft sensor provided in the joint portion of each finger may separately include a sensor measuring the bending and stretching movements and a sensor measuring the adduction and abduction movements. In this case, the sensor measuring the bending and stretching movements may be formed long in a longitudinal direction of the fingers and may function as a sensor measuring bending and stretching of the fingers. The sensor measuring the adduction and abduction movements may be formed perpendicular to the longitudinal direction of the fingers or long in adduction direction and abduction direction of the fingers, and may function as a sensor measuring adduction and abduction of the fingers. Herein, since the sensor measuring the bending and stretching movements and the sensor measuring the adduction and abduction movements vary in length, height, and width in response to movements of the fingers, the movements of the fingers may be measured by measuring a change in resistance. The above description will be described in more detail with references to FIGS. 2 and 3.

The connection unit 130 may be provided inside or on one side of the elastic sheet 110 to connect the sensor unit 120 to the wire unit 140. As described above, the connection unit 130 may be formed by printing a conductive paste on the first elastic layer 111 by using a 3D printer or the like. In an embodiment, the conductive paste is described as a silver paste as an example. As described above, the connection unit 130 may be separately or integrally formed at both ends of the sensor unit 120.

The wire unit 140 may be electrically connected to the connection unit 130 and function to deliver an electrical signal transmitted from the sensor unit 120 to a chip (not shown). As described above, the wire unit 140 may be formed by printing a conductive paste on the first elastic layer 111 or the base substrate (see 101 of FIG. 5A) by a 3D printer or the like.

Hereinafter, an operating principle of the soft sensor according to an embodiment will now be described in more detail.

Figure 2:
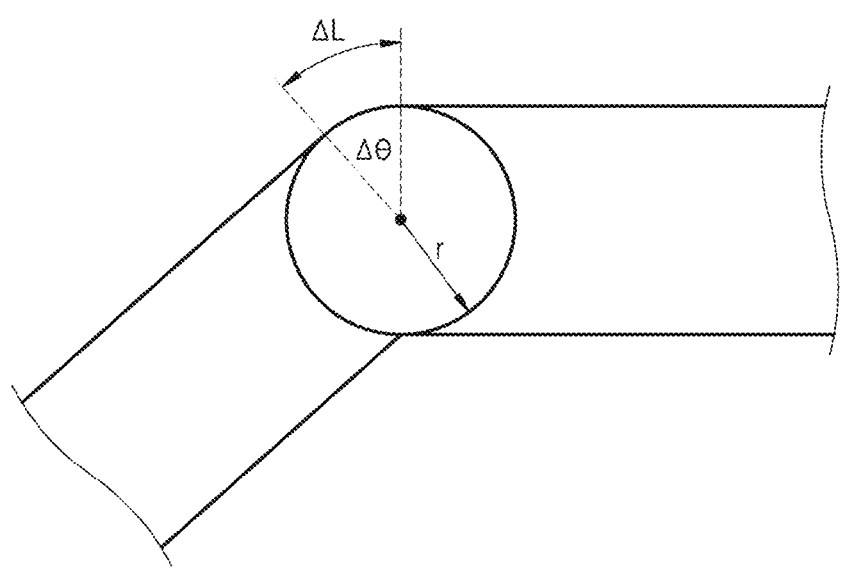
FIG. 2 is a schematic diagram illustrating a change in length of a sensor unit of the soft sensor of FIG. 1 according to a change of a finger joint.

FIG. 2 is a mimetic diagram illustrating a change in length of the sensor unit 120 of the soft sensor according to a change in an angle of a finger joint, according to an embodiment.

Referring to FIG. 2, a principle of the soft sensor of an embodiment is as follows.

Generally, when the resistance of both ends of a micro channel of the soft sensor is referred to as a resistance of conductive metal R, the resistivity of a conductive material in the channel is referred to as an electrical resistivity ρ ([Ω*m]), the channel volume is referred to as a channel volume V ([m$^2$]), the channel length is referred to as a channel length l ([m]), and the strain is referred to as ε, and when a highly elastic material inside the micro channel is filled with an incompressible material, a total volume V of the micro channel remains constant and is represented by Equation 1 below.

$$V = A_0 l_0 = Al \quad \text{[Equation 1]}$$

The channel may be viewed as a path through which electrons in a conductive metal pass and, when an appearance of the conductive metal changes, the length, height, width, or the like of the channel may vary and the resistance may also change.

Herein, the channel length is represented by Equation 2 below and a channel cross-sectional area A is represented by Equation 3 below.

$$l = l_0(1+\varepsilon) \quad \text{[Equation 2]}$$

$$A = A_0/(1+\varepsilon) \quad \text{[Equation 3]}$$

The resistance of the conductive metal is represented by Equation 4 below.

$$R = \rho l/A \quad \text{[Equation 4]}$$

A current resistance R may be represented by Equation 5 below by an initial resistance $R_0$ and the strain ε.

$$R = R_0(1+\varepsilon)^2 \quad \text{[Equation 5]}$$

Referring to FIG. 2, an angle change Δθ and a radius r in a finger joint and a change in length of the channel ΔL are represented by Equation 6 below.

$$\Delta L = r\Delta\theta \quad \text{[Equation 6]}$$

Equation 7 may be obtained when Equation 6 is transposed.

$$\Delta\theta = \Delta L/r \quad \text{[Equation 7]}$$

As r is a constant, the angle change Δθ of the finger joint may be calculated through the change in length of the channel ΔL.

Herein, a properly formed amplifier may be used to measure the resistance change of the soft sensor and the resistance change ΔR of the soft sensor may be calculated from the voltage change ΔV measured at an amplifier depending on a nature of the amplifier.

In this case, the strain ε may be calculated by using the resistance change ΔR of the soft sensor measured according to Equation 5, and the change in length ΔL of the channel may be calculated by using the stain ε.

Accordingly, when a sensor with respect to a voltage change ΔV is provided in the soft sensor of an embodiment, the angle change Δθ of the finger joint may be obtained.

For convenience of explanation, the finger joint is described as an example. However, the soft sensor of the embodiment may be worn in all joints of other portions of the body.

Figure 3:
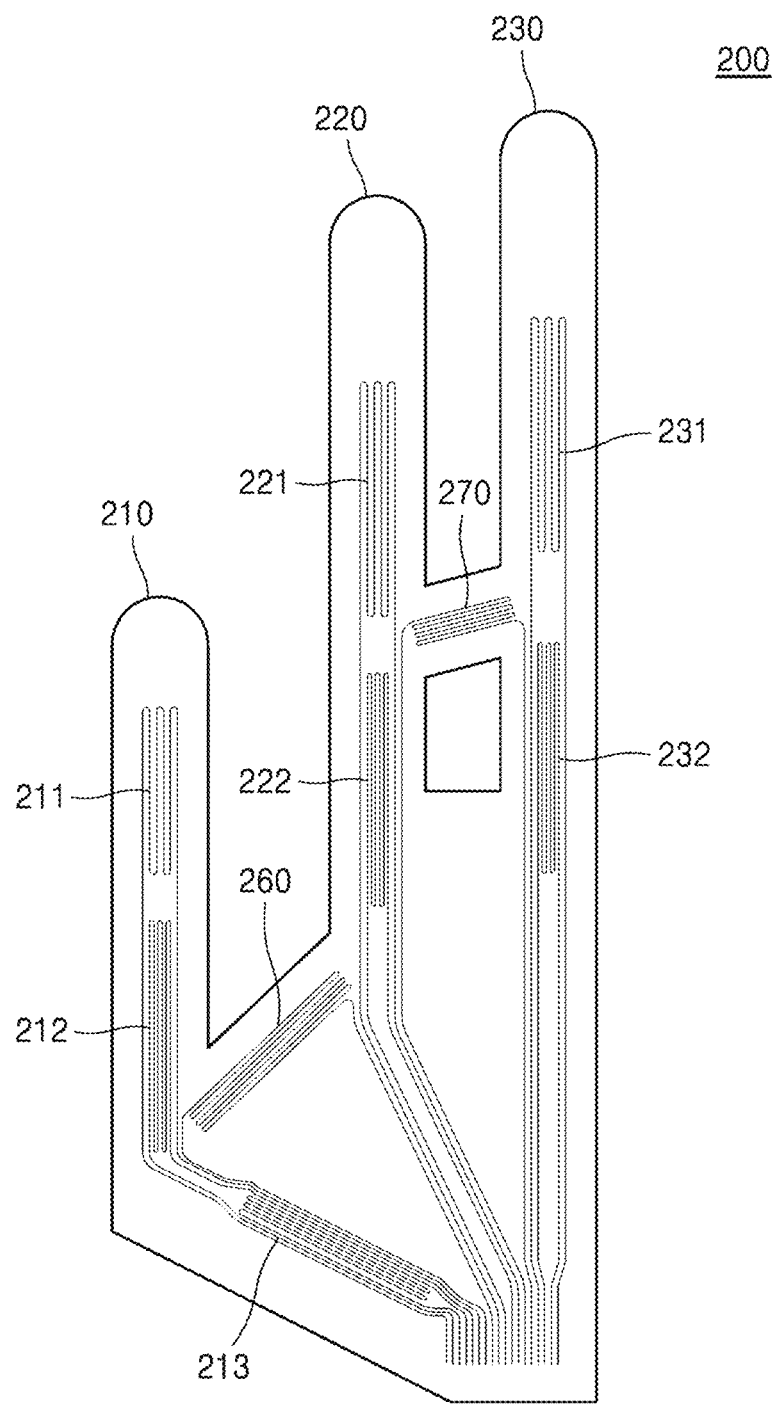
FIG. 3 is a plan view of a hand-wearable device having the soft sensor of FIG. 1.
Figure 4:
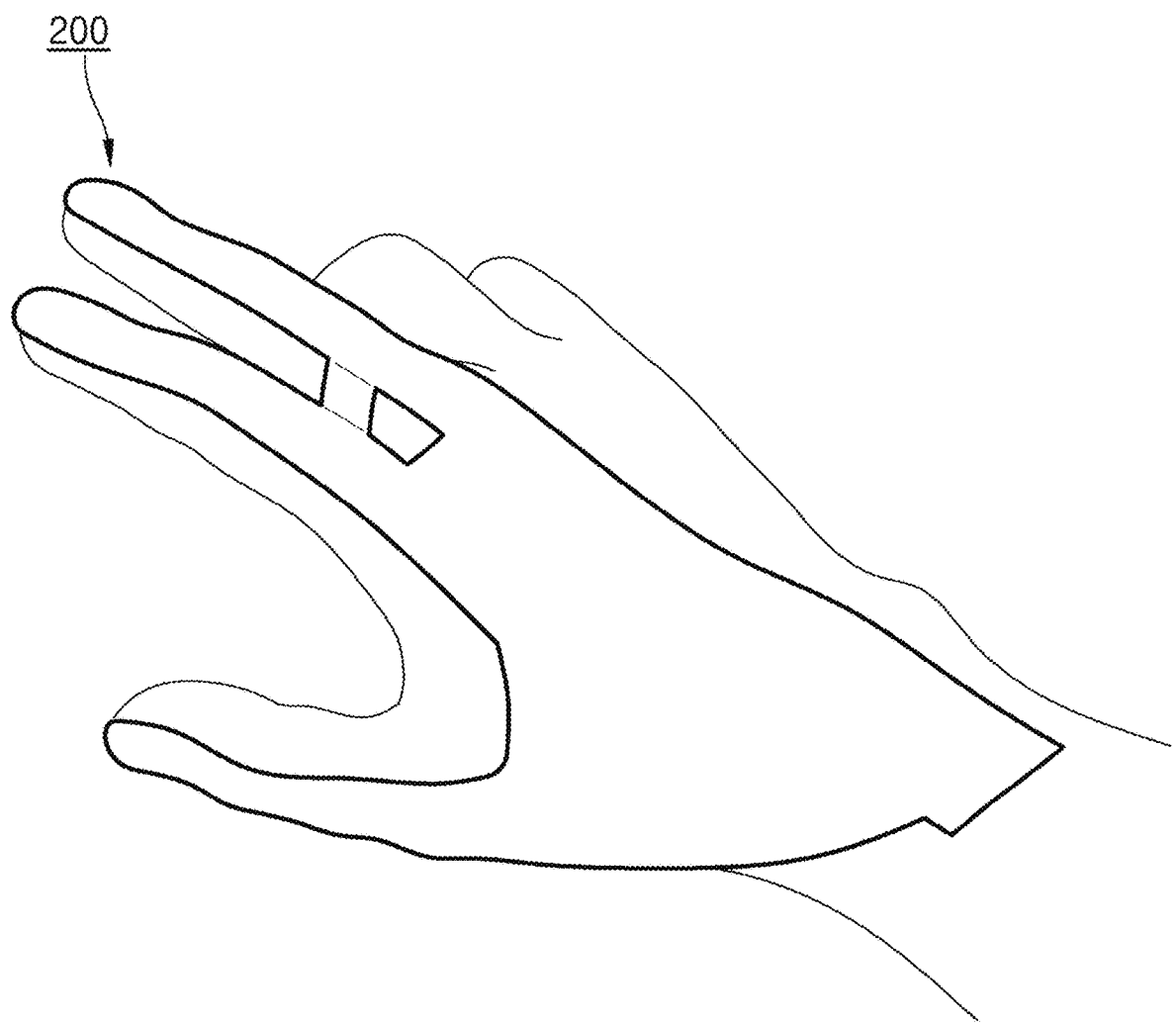
FIG. 4 is a perspective view illustrating a state in which the hand-wearable device of FIG. 3 is worn on a hand.

FIG. 3 is a plan view of a hand-wearable device having the soft sensor of FIG. 1. FIG. 4 is a perspective view illustrating a state in which the hand-wearable device of FIG. 3 is worn on a hand.

Referring to FIGS. 3 and 4, a hand-wearable device 200 may be a sheet of elastic material, in which a plurality of soft sensors 100 are formed to correspond to each joint of a finger. Herein, the hand-wearable device 200 may be formed in a shape corresponding to at least a portion of a hand shape. In an embodiment, the hand-wearable device 200 is described as an example in that the hand-wearable device 200 is formed in a hand shape and a sheet shape to be attached to the back of a hand or a glove, but the inventive concept is not limited thereto. The hand-wearable device 200 may be formed in a form of a glove to which a hand may be fitted. As described above, the hand-wearable device 200 may be formed in a circular or rectangular shape greater than a desired shape, and then may be cut and formed into the desired shape by laser cutting. In other words, sensor units 120 are formed by cutting, into a shape for a worn portion, a remaining portion of the elastic sheet 110 except for a portion in which the soft sensors are formed. The plurality of sensor units 120 may be located at joint portions of each finger to detect a movement of the finger.

The hand-wearable device 200 of FIGS. 3 and 4 will be described in more detail below.

The hand-wearable device 200 includes a thumb sensing unit 210, an index finger sensing unit 220, and a middle finger sensing unit 230. Although not illustrated in the drawing, the hand-wearable device 2000 may further include a ring finger sensing unit and a little finger sensing unit.

In addition, the hand-wearable device 200 includes a first adduction/abduction measuring sensor 260 between the thumb sensing unit 210 and the index finger sensing unit 220 and a second adduction/abduction measuring sensor 270 between the index finger sensing unit 220 and the middle finger sensing unit 230. Although not illustrated in the drawing, the hand-wearable device 200 may further include a third adduction/abduction measuring sensor (not shown) formed on a side of the index finger to measure the adduction and abduction of the index finger. Furthermore, although not illustrated in the drawing, the hand-wearable device 200 may further include a fourth adduction/abduction measuring sensor (not shown) between the middle finger sensing unit 230 and the ring finger sensing unit (not shown) and a fifth adduction/abduction measuring sensor (not shown) between the ring finger sensing unit (not shown) and the little finger sensing unit (not shown).

The thumb sensing unit 210 may include a first thumb portion sensor 211, a second thumb portion sensor 212, and a third thumb portion sensor 213. The first thumb portion sensor 211 may measure the bending and stretching between the distal phalanx and proximal phalanx of the thumb. The second thumb portion sensor 212 may measure the bending and stretching between the proximal phalanx and the metacarpals of the thumb. The third thumb portion sensor 213 may measure the bending and stretching between the metacarpals and carpals of the thumb.

The index finger sensing unit 220 may include a first index finger portion sensor 221, a second index finger portion sensor 222. The first index finger portion sensor 221 may measure the bending and stretching between the middle phalanx and the proximal phalanx of the index finger. The second index finger portion sensor 222 may measure the bending and stretching between the proximal phalanx and the metacarpals of the index finger.

The middle finger sensing unit 230 may include a first middle finger portion sensor 231 and a second middle finger portion sensor 232. The first middle finger portion sensor 231 may measure the bending and stretching between the middle phalanx and the proximal phalanx of the index finger. The second middle finger portion sensor 232 may measure the bending and stretching between the proximal phalanx and the metacarpals of the index finger.

The ring finger sensing unit (not shown) may include a first ring finger portion sensor and a second ring finger portion sensor and the little finger sensing unit (not shown) may include a first little finger portion sensor and a second little finger portion sensor.

The first adduction/abduction measuring sensor 260 may be between the thumb sensing unit 210 and the index finger sensing unit 220 and measure the adduction and abduction of the thumb.

The second adduction/abduction measuring sensor 270 may be between the index finger sensing unit 220 and the middle finger sensing unit 230 and measure the adduction and abduction of the index finger.

In addition, a third adduction/abduction measuring sensor (not shown) and a fourth adduction/abduction measuring sensor (not shown) may also be further formed.

Herein, according to the hand-wearable device 200 according to an embodiment of the present disclosure, a plurality of channel patterns corresponding to each joint of fingers having different lengths and shapes may be integrally designed in one hand-wearable device by a computer-aided design (CAD). In other words, in an embodiment, since the channel patterns are designed by using the CAD, it is easy to design the plurality of channel patterns at once.

As described above, since the plurality of sensor units 120 may be formed at once by using 3D printing or the like, it is easy to manufacture a sensor having a large area size. In addition, since a mold forming the plurality of channel patterns is not needed, manufacturing may be simplified and cost may be reduced.

Although the drawing shows a hand-wearable device worn on three fingers of thumb, index finger, and middle finger and soft sensors arranged on the hand-wearable device, the inventive concept is not limited thereto. In other words, the soft sensors corresponding to all five fingers or some of the fingers, may be arranged on the hand-wearable device, or some soft sensors may be added or omitted in each finger.

Since the soft sensor according to an embodiment is not limited in size and has a very low thickness and elasticity, the sensor unit 120 may be formed in various numbers and shapes and applying to joins such as shoulders, ankles, wrists, fingers or the like having various sizes and complicated movements is easy.

Although not illustrated in the drawing, the hand-wearable device 200 may further include a chip. The chip may be inserted in a position corresponding to the wrist in the elastic sheet 110. The chip may be inserted by an insert-printing method. The chip may include a flexible printed circuit board (FPCB), a motor driver, a micro control unit, a wireless communication unit, or the like.

Although not illustrated in the drawing, the hand-wearable device 200 may further include a finger wearing portion and a wrist wearing portion. The finger wearing portion and the wrist wearing portion may be separately manufactured from the elastic sheet 110 and then attached to the elastic sheet 110 or may be formed as a single body with the elastic sheet 110.

Figure 5:
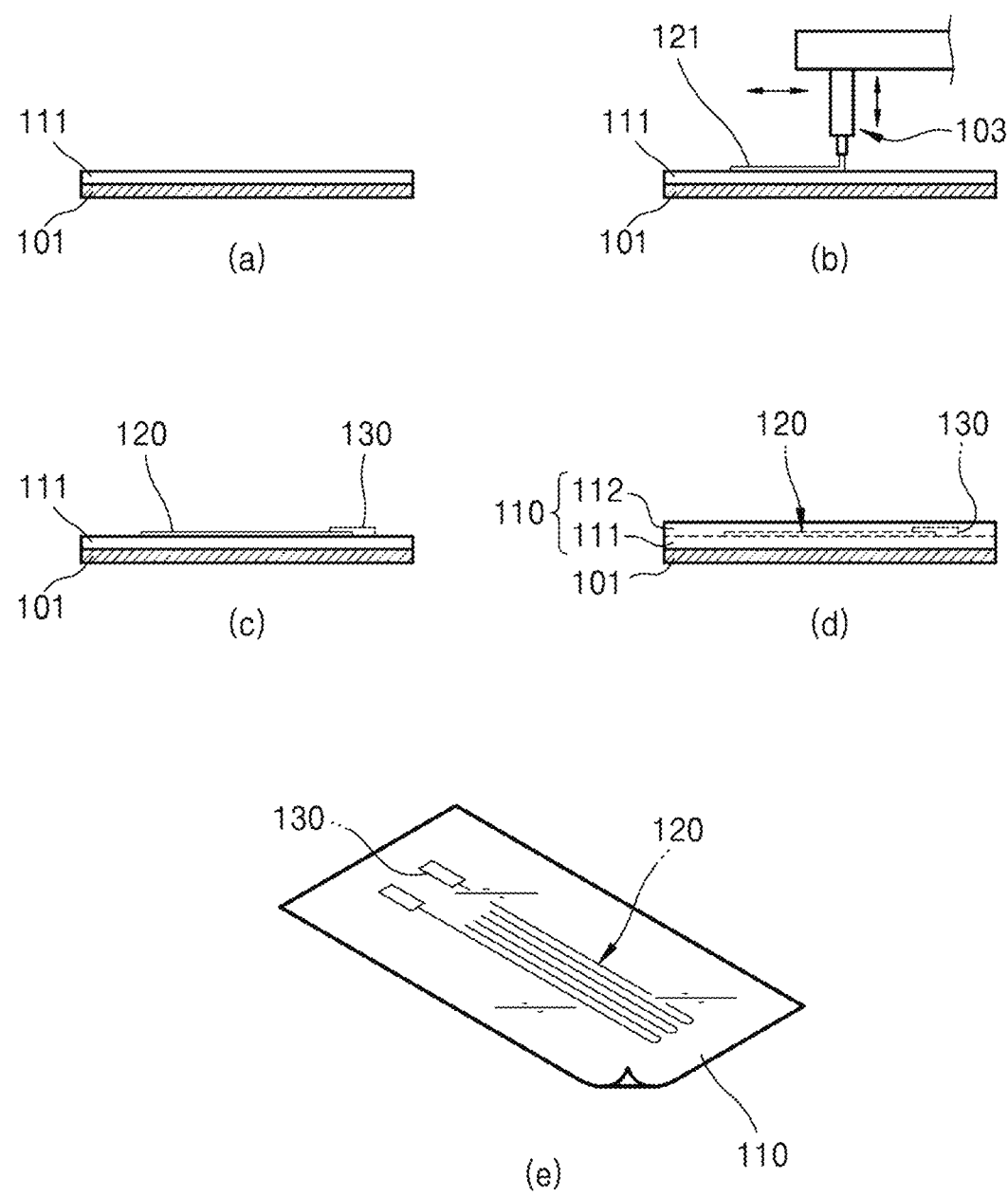
FIG. 5 are diagrams illustrating a method of manufacturing the soft sensor of FIG. 1.

FIG. 5 are diagrams illustrating a method of manufacturing the soft sensor of FIG. 1. Referring to FIG. 5A, the first elastic material is coated on the base substrate 101. After coating the first elastic material, the first elastic material hardens when a predetermined time passes and forms the first elastic layer 111. Herein, FIG. 5A illustrates that a cross-section of the first elastic layer 111 includes a rectangular shape as an example, but the inventive concept is not limited thereto. The first elastic layer 111 may be formed in various sizes and shapes.

A glass wafer may be used as the base substrate 101.

Since the first elastic layer 111 has a very low thickness and good elasticity, the first elastic layer 111 may be manufactured in various shapes and sizes, and may be cut and used according to a desired shape.

Next, referring to FIG. 5B, a conductive liquid metal is printed on the first elastic layer 111 by using a nozzle 103.

The EGaIn, which is the conductive liquid metal, may be accommodated in the nozzle 103. The nozzle 103 may be coupled to a computerized numerical control (CNC) equipment and may be controlled to be movable in the directions of three axes. The CNC equipment may be a 3D printer and may include a three-axis controller, an injecting controller, a microscope, or the like.

The nozzle 103 may print the conductive liquid metal while moving in a predetermined path by a control of the three-axis controller. Paths in the directions of three axes may be respectively set according to the channel patterns.

Herein, the channel pattern may be designed as a pattern of microchannels desired by the user using the CAD. Since the channel pattern is designed by using the CAD, the size and number of the channel pattern are easy to be designed and modified. The shape, size, and number of channel patterns may be set according to a purpose, size, or the like of the soft sensor.

After designing the channel pattern, a G code is generated by using a CAM and the G code is modified by using a simulator, and then transferred to the three-axis controller. Accordingly, the channel pattern is easy to be designed and modified by using a CAD/CAM. In addition, there is no need to manufacture a separate mold to form the channel pattern.

When the conductive liquid metal is printed by the nozzle 103, the shape, size, and characteristics of the sensor unit 120 may be adjusted by adjusting process variables. Herein, the process variables may include an inner diameter of the nozzle 103, an injecting pressure of the nozzle 103, a distance between the nozzle 103 and the first elastic layer 111, and a transportation rate of the nozzle 103. By suitably combining the process variables, the shape and size of a desired sensor unit and a characteristic of the soft sensor may be adjusted. The process variables may be directly set by the user or may be set under an optimum condition by a preset program.

As the inner diameter of the nozzle 103 decreases, a width and a height of the cross-section of the sensor unit 120 may be decreased. The performance of the sensor unit may vary depending on the width and height of the cross-section of the sensor unit 120. When the width and height of the cross-section of the sensor unit 120 decreases, the sensitivity of the soft sensor increases.

The nozzle 103 is detachably coupled to the CNC equipment and may be replaceable. In addition, only a needle of the nozzle 103 may be replaceable.

As a pressure injecting the conductive liquid metal from the nozzle 103 increases, the width and height of the cross-section of the sensor unit 120 increase. The pressure of the nozzle 103 is controlled by a nozzle controller.

When a distance between the nozzle 103 and the first elastic layer 111 decreases, an area where a droplet of the conductive liquid metal formed at an end of the needle of the nozzle 103 in contact with the first elastic layer 111 varies. In other words, when the distance between the nozzle 103 and the first elastic layer 111 decreases, the size of the droplet increase, and thus, the width of the cross-section of the sensor unit increases. The distance between the nozzle 103 and the first elastic layer 111 may be controlled by controlling the height of the nozzle 103 by the three-axis controller.

When the transportation rate of the nozzle 103 increases, the height of the cross-section of the sensor unit 120 decreases. The transportation rate of the nozzle 103 is controlled by the three-axis controller.

Next, referring to FIG. 5C, the connection unit 130 is formed on an end of the sensor unit 120. The connection unit 130 may be provided inside or on one side of the elastic sheet 110 to connect the sensor unit 120 to the wire unit 140. As described above, the connection unit 130 may be formed by printing the conductive paste on the sensor unit 120 by using a 3D printer or the like. Alternatively, the connection unit may be formed by various methods such as directly inserting the wire unit 140 into the sensor unit 120, printing a liquid metal, coating a conductive material other than the conductive paste, or the like.

Next, referring to FIG. 5D, the second elastic layer 112 is formed by coating the second elastic material on the first elastic layer 111 on which the sensor unit 120 is formed.

When the second elastic layer 112 is hardened, the second elastic layer 112 is cut into a desired shape by using cutting. In FIG. 5E, the shape of the elastic sheet 110 is shown as simplified, but after forming the elastic sheet 110 including the sensor unit 120 shown in FIG. 3, the elastic sheet 110 may be cut in a hand or glove shape by using laser cutting.

Finally, the elastic sheet 110 may be removed from the base substrate 101 to complete a soft sensor and a hand-wearable device having the soft sensor.

In the soft sensor manufactured in the above method, since the sensor unit 120 maintains a liquid state between the first elastic layer 111 and the second elastic layer 112, the elasticity of the sensor unit 120 may be maintained.

In addition, the soft sensor may be made with a thickness less than that of using a mold, and the channel pattern may be easily designed and changed by using the CAD/CAM.

Figure 6:
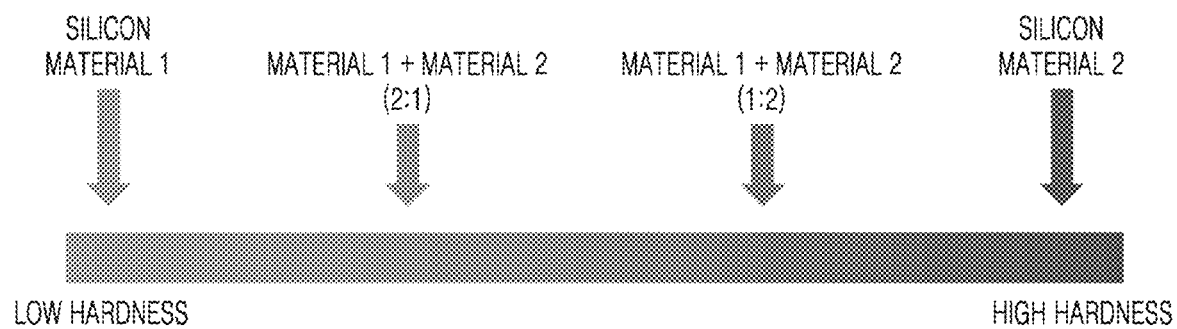
FIG. 6 is a conceptual diagram illustrating a method of controlling mechanical properties of a soft sensor by using a combination of multiple silicon materials in a soft sensor according to an embodiment.

FIG. 6 is a conceptual diagram illustrating a method of controlling a mechanical property of a soft sensor by using a combination of multiple silicon materials in a soft sensor according to an embodiment.

Referring to FIG. 6, the elastic sheet (see 110 of FIG. 1) may be manufactured by mixing two or more different materials (for example, silicon materials) with different physical, mechanical, chemical, and rheological properties.

In other words, commercial silicon materials include own physical, mechanical, chemical, and rheological properties. For example, certain silicon materials have mechanical properties such as defined hardness and stiffness. In addition, as described above, the mechanical properties of the silicon material affect the performance of the soft sensor manufactured.

In the soft sensor of the present disclosure, since the conductive liquid metal maintains the liquid state, the sensor unit (see 120 of FIG. 1) may not be lengthened in a height direction. In addition, since there is no internal pressure, the soft sensor may have a risk of easily broken when pressure is applied from the outside. Accordingly, the elastic sheet (see 110 of FIG. 1) should have exactly a required hardness, but it is difficult to achieve the required hardness with commercial silicone material.

To solve the above difficulty, in the soft sensor (see 100 of FIG. 1), two different materials (for example, silicone materials) with different physical, mechanical, chemical, and rheological properties may be mixed to manufacture the elastic sheet (see 110 of FIG. 1).

In other words, a first silicon material having a relatively low first hardness and a second silicon material having a relatively high second hardness are mixed in a proper ratio to manufacture a silicon material having a desired hardness, the silicon material is used to manufacture the elastic sheet (see 110 of FIG. 1). As described above, commercial silicon materials are mixed in a proper ratio to adjust the mechanical property of the elastic sheet, and thus, an effect of achieving the desired mechanical property of the elastic sheet may be obtained.

Although not illustrated in the drawing, a color may be added to the elastic sheet (see 110 of FIG. 1) by using a silicone pigment.

In other words, in a case that an elastic material, in particular a silicon material, constitutes the elastic sheet (see 110 of FIG. 1), a transparent or semi-transparent silicon material is generally used. However, when transparent silicon is used, since a shape of an inner liquid metal channel is revealed, a problem of low commerciality may occur.

To solve the above problem, the silicon may be colored by using the silicone pigment, such that soft sensors with various colors may be manufactured. Color control may be performed according to a formulation of the silicone pigment. In addition, when the elastic sheet is formed in a multilayer, an outwardly formed layer (for example, a fourth elastic layer 314 of FIG. 9) uses a colored opaque silicon material and a layer inwardly formed and in contact with the user's hand (for example, the first elastic layer 311 of FIG. 9) uses transparent or semi-transparent silicon material, such that a shape of the sensor unit 320 may be checked.

Mode of Disclosure

Hereinafter, a hand-wearable device according to another embodiment will be described below. Herein, the hand-wearable device 400 according to another embodiment additionally having a third adduction/abduction measuring sensor 480 one a side of the index finger is different in a characteristic to the hand-wearable device (see 200 of FIG. 3) according to an embodiment. Hereinafter, a configuration of the third adduction/abduction measuring sensor 480 will be described below.

Figure 7:
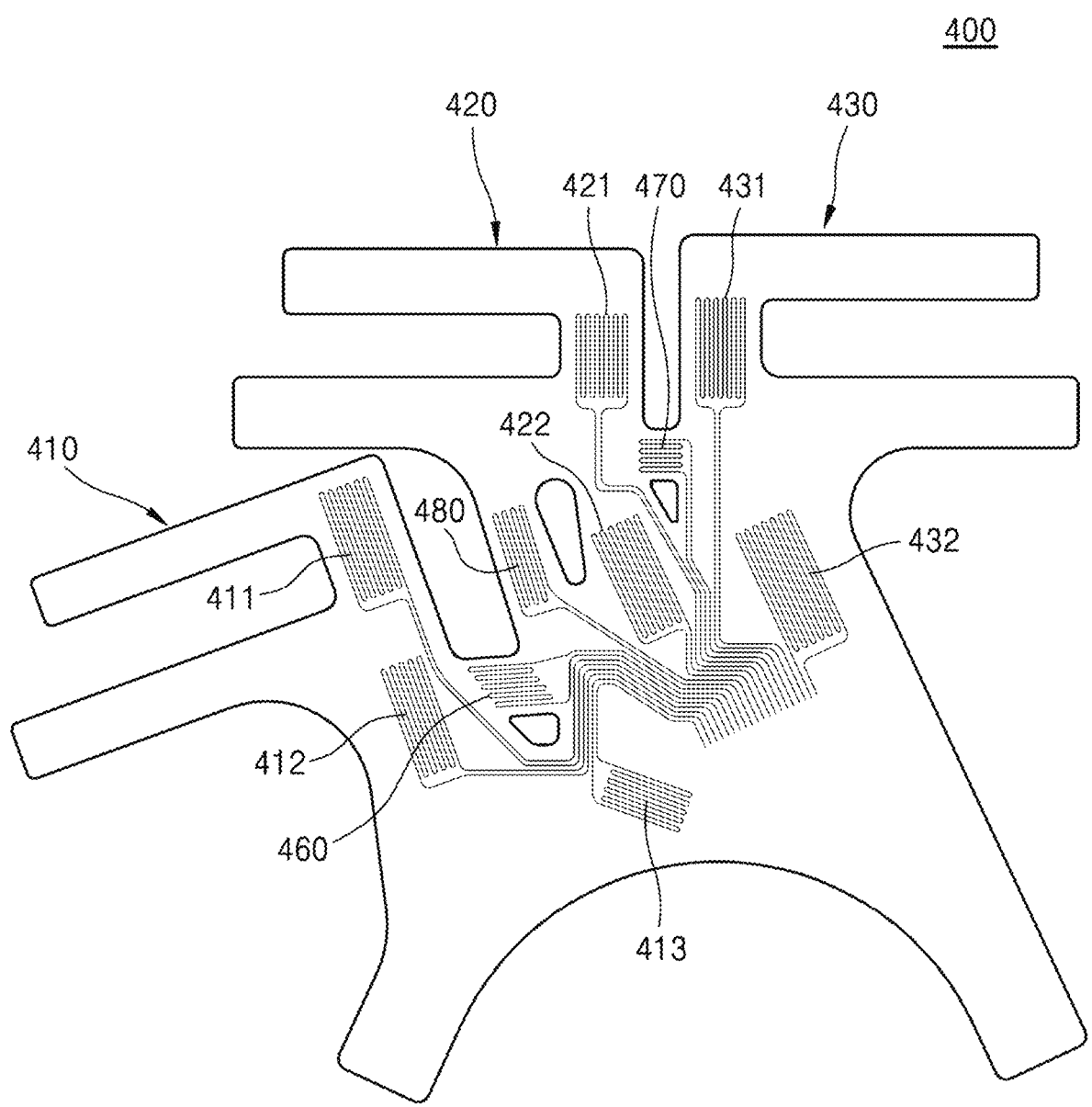
FIG. 7 is a plan view of a hand-wearable device according to another embodiment.
Figure 8:
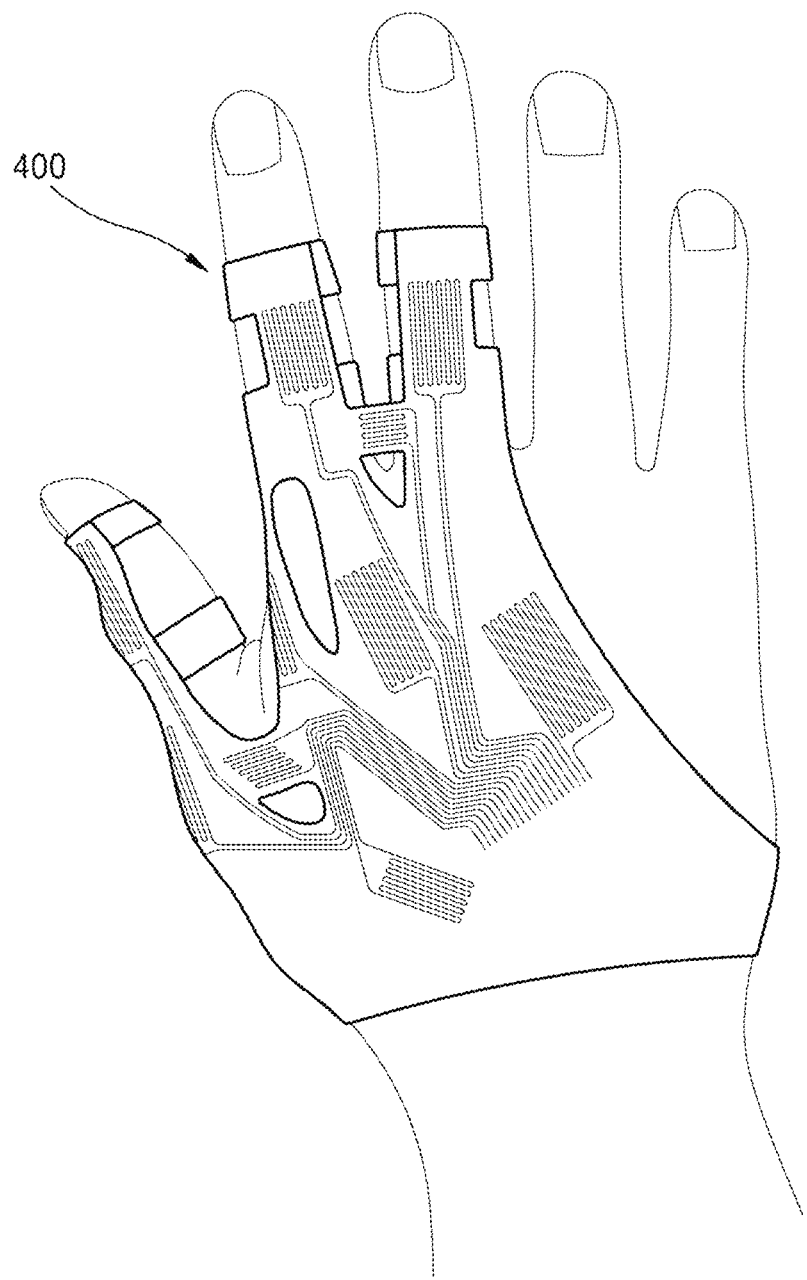
FIG. 8 is a perspective view illustrating a state in which the hand-wearable device of FIG. 7 is worn on a hand.

FIG. 7 is a plan view of a hand-wearable device according to another embodiment. FIG. 8 is a perspective view illustrating a state in which the hand-wearable device of FIG. 7 is worn on a hand.

Referring to FIGS. 7 and 8, the hand-wearable device 400 includes a thumb sensing unit 410, an index finger sensing unit 420, and a middle finger sensing unit 430. Although not illustrated in the drawings, the hand-wearable device 400 may also include a ring finger sensing unit and a little finger sensing unit.

In addition, the hand-wearable device 400 includes a first adduction/abduction measuring sensor 460 between the thumb sensing unit 410 and the index finger sensing unit 420 and a second adduction/abduction measuring sensor between the index finger sensing unit 420 and the middle finger sensing unit 430. In addition, the hand-wearable device 400 includes the third adduction/abduction measuring sensor 480 formed on a side of the index finger sensing unit 420 and measuring the adduction and abduction of the index finger.

Although not illustrated in the drawings, the hand-wearable device 400 may further include a fourth adduction/abduction measuring sensor (not shown) between the middle finger sensing unit 430 and the ring finger sensing unit (not shown) and a fifth adduction/abduction measuring sensor (not shown) between the ring finger sensing unit (not shown) and the little finger sensing unit (not shown).

The thumb sensing unit 410 may include a first thumb portion sensor 411, a second thumb portion sensor 412, and a third thumb portion sensor 413. The first thumb portion sensor 411 may measure the bending and stretching between the distal phalanx and proximal phalanx of the thumb. The second thumb portion sensor 412 may measure the bending and stretching between the proximal phalanx and metacarpals of the thumb. The third thumb portion sensor 413 may measure the bending and stretching between the metacarpals and carpals of the thumb.

The index finger sensing unit 420 may include a first index finger portion sensor 421 and a second index finger portion sensor 422. The first index finger portion sensor 421 may measure the bending and stretching between the middle phalanx and proximal phalanx of the index finger. The second index finger portion sensor 422 may measure the bending and stretching between the proximal phalanx and metacarpals of the index finger.

The middle finger sensing unit 430 may include a first middle finger portion sensor 431 and a second middle finger portion sensor 432. The first middle finger portion sensor 431 may measure the bending and stretching between the middle phalanx and proximal phalanx of the middle finger. The second middle finger portion sensor 432 may measure the bending and stretching between the proximal phalanx and metacarpals of the middle finger.

The first adduction/abduction measuring sensor 460 may be between the thumb sensing unit 410 and the index finger sensing unit 420 and measure the adduction and abduction of the thumb.

The second adduction/abduction measuring sensor 470 may be between the index finger sensing unit 420 and the middle finger sensing unit 430 and measure the adduction and abduction of the middle finger.

The third adduction/abduction measuring sensor 480 may be formed on one side of the index finger sensing unit 420 and measure the adduction and abduction of the index finger.

Herein, the hand-wearable device 400 according to an embodiment may further include the third adduction/abduction measuring sensor 480 on the one side of the index finger to separate a signal of the adduction/abduction measuring sensor from a signal of a bending/stretching measuring sensor. In other words, in a case of an embodiment shown in FIG. 3, since the adduction/abduction of the index finger and the middle finger may not be independently measured, the present embodiment may further include the third adduction/abduction measuring sensor 480 on the one side of the index finger to independently measure the adduction and abduction of the index finger and the middle finger.

Although the drawing shows a hand-wearable device worn on three fingers of thumb, index finger, and middle finger and soft sensors arranged on the hand-wearable device, the inventive concept is not limited thereto. In other words, the soft sensors corresponding to all five fingers or some of the fingers, may be arranged on the hand-wearable device, or some soft sensors may be added or omitted in each finger.

Hereinafter, a soft sensor 300 according to another embodiment will be described below. Herein, the soft sensor 300 according to another embodiment has different characteristics from the soft sensor (see 100 of FIG. 1) according to an embodiment in that an elastic sheet 310 is formed of a multilayer of different materials. Hereinafter, a configuration of the elastic sheet 310 will be mainly described below.

Figure 9:
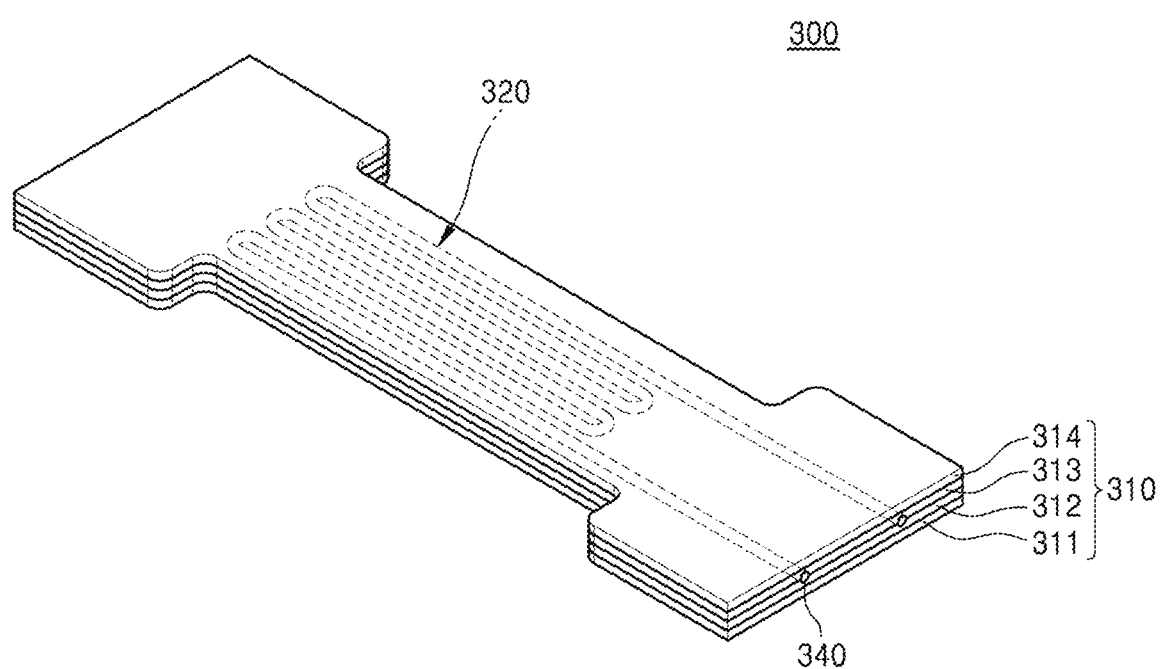
FIG. 9 is a perspective view of a soft sensor according to another embodiment.

FIG. 9 is a perspective view of the soft sensor according to another embodiment.

Referring to FIG. 9, the soft sensor 300 according to another embodiment may include the elastic sheet 310, a sensor unit 320, and a wire unit 340. In addition, although not illustrated in the drawings, the soft sensor 300 according to another embodiment may further include a connection unit (not shown) formed on an end of the sensor unit 320.

In detail, the elastic sheet 310 may include a first elastic layer 311, a second elastic layer 312, a third elastic layer 313, and a fourth elastic layer 314. Each of the elastic layers may be separately formed and may be a stacked structure in a vertical direction. Herein, although the elastic sheet 310 is shown as including four layers, the inventive concept is not limited thereto. The elastic sheet 310 may be formed in a plurality of layers of various materials when needed. The elastic sheet 310 will be described in detail below.

The elastic sheet 310 may have different physical and mechanical properties required for each layer depending on a required sensor performance. For example, when the elastic sheet 310 only includes a material having a high elasticity to secure the flexibility of the sensor, durability problems with external concentrated loads may occur. In detail, in the soft sensor of the present disclosure, since the conductive liquid metal maintains a liquid state, the sensor unit (see 120 of FIG. 1) includes a semicircular cross-section, and thus, there is a limit of aspect ratio. In addition, due to characteristics of a manufacturing process, a liquid metal of the same volume as an internal channel volume is injected such that there is no internal pressure. Accordingly, an electrical connection of the sensor unit is broken by external pressure, which may cause a problem in that the electrical connection may not be restored only by the elasticity of the material.

Each of the first elastic layer 311, the second elastic layer 312, the third elastic layer 313, the fourth elastic layer 314 is a layer formed by coating with an elastic material. In this case, the elastic material may be a non-conductive material having elasticity and flexibility, and typically, a silicon material may be used.

However, as the silicon material also include materials having various physical, mechanical, chemical, and rheological properties, the performance of the soft sensor may vary depending on the nature of the silicon material. In addition, the performance of the soft sensor may vary depending on a process condition in a process of manufacturing the soft sensor by using the silicon material.

For example, various silicon materials exist that differ in at least some of the mechanical and rheological properties of the silicon materials, such as hardness, stiffness, tackiness, and viscosity. According to the mechanical and rheological properties, the performance of the soft sensor, that is, a measuring range (stretching range) of a tensile sensor, a resistance generated by the sensor when the sensor undergoes tension (tensile sensor), a resistance generated by the sensor during sensor compression (compression sensor), a measuring range (pressure range) of a pressure sensor, and a durability against concentrated load, may be different.

In addition, the performance of the soft sensor may vary depending on the process condition in the process of manufacturing the soft sensor by using the silicon material. For example, the viscosity of the silicon material, a rotation speed when spin-coating the silicon material, and a height of a silicon-coated plate affect the thickness of the soft sensor, and the thickness of the soft sensor affects the performance of the soft sensor described above.

Accordingly, the soft sensor 300 according to another embodiment manufactures a soft sensor to satisfy a designed performance by forming the elastic sheet 310 in a multilayer of different materials and using mechanical properties of various silicon materials. In other words, a desired mechanical property of a sensor may be included by combining multiple silicon materials instead of one silicon material.

For example, the second elastic layer 312 and the third elastic layer 313 located inside the soft sensor 300 use a material having high hardness such that the electrical connection of the sensor unit 320 including the conductive liquid metal is not broken by external pressure. Herein, when a total thickness of the sensor is low, the soft sensor may be physically broken during use and liquid metal may be leaked. Accordingly, when only high hardness material is used to secure a certain level of the total thickness, the elasticity of the soft sensor 300 is difficult to be secured.

Accordingly, the problem may be solved by using a material having low hardness and good elasticity in the first elastic layer 311 and the fourth elastic layer 314 located outside the soft sensor 300.

Therefore, the soft sensor 300 having high hardness in the vicinity of the sensor unit 320 but with good elasticity as a whole may be manufactured by forming the first elastic layer 311 and the fourth elastic layer 314 with a silicon material having a relatively high elasticity and forming the second elastic layer 312 and the third elastic layer 313 with a silicon material having a relatively high hardness. By forming a layer having a high hardness, that is the second elastic layer 312 and the third elastic layer 313 to a minimum thickness, the sensor unit may be formed to increase the durability without harming the elasticity of an entire sensor.

As described above, a composition and a resulting mechanical property of the silicon layer may be determined by the thickness and combination of the various silicon layers and a desired mechanical property of the sensor may be easily realized by forming a multilayer of silicon materials that satisfies the physical and mechanical properties required for each portion of the sensor.

In other words, the first elastic layer 311 and the fourth elastic layer 314 exposed to the outside may include the same silicon material having relatively high elasticity and the second elastic layer 312 and the third elastic layer 313 located inside may include the same silicon material having relatively high hardness.

Alternatively, the first elastic layer 311 and the fourth elastic layer 314 may include different silicon materials when needed.

In detail, in a case of the first elastic layer 311 which is in direct close contact with the user's skin, a silicon material having a higher adhesiveness than any other layers may be used. When the first elastic layer 311 which is in direct close contact with the user's skin is manufactured by using the silicon material having a high adhesiveness, the soft sensor may be stably attached to the user's hand without a separate wearing structure (such as Velcro).

Herein, the soft sensor 300 may be in direct contact and worn on the skin of the back of a hand and a finger or may be in contact and worn on a latex glove in a state in which the user wears the latex glove.

Furthermore, in a case of the first elastic layer 311, instead of forming the whole of a material having a high adhesiveness, a structure that partially has adhesiveness by arranging an adhesive material only in necessary portion (for example, regions corresponding to the joints of the fingers) is possible to be manufactured. In a case of the structure having partial adhesiveness, improvements in the functionality of a sensor may also be expected. Accordingly, locations, areas, or the like of an adhesive region and a non-adhesive region may be variously designed to realize a desired functionality.)

On the other hand, in a case of the fourth elastic layer 314 formed on an upper portion of the soft sensor 300, a material having low adhesiveness may be used to prevent unnecessary contamination.

Figure 10:
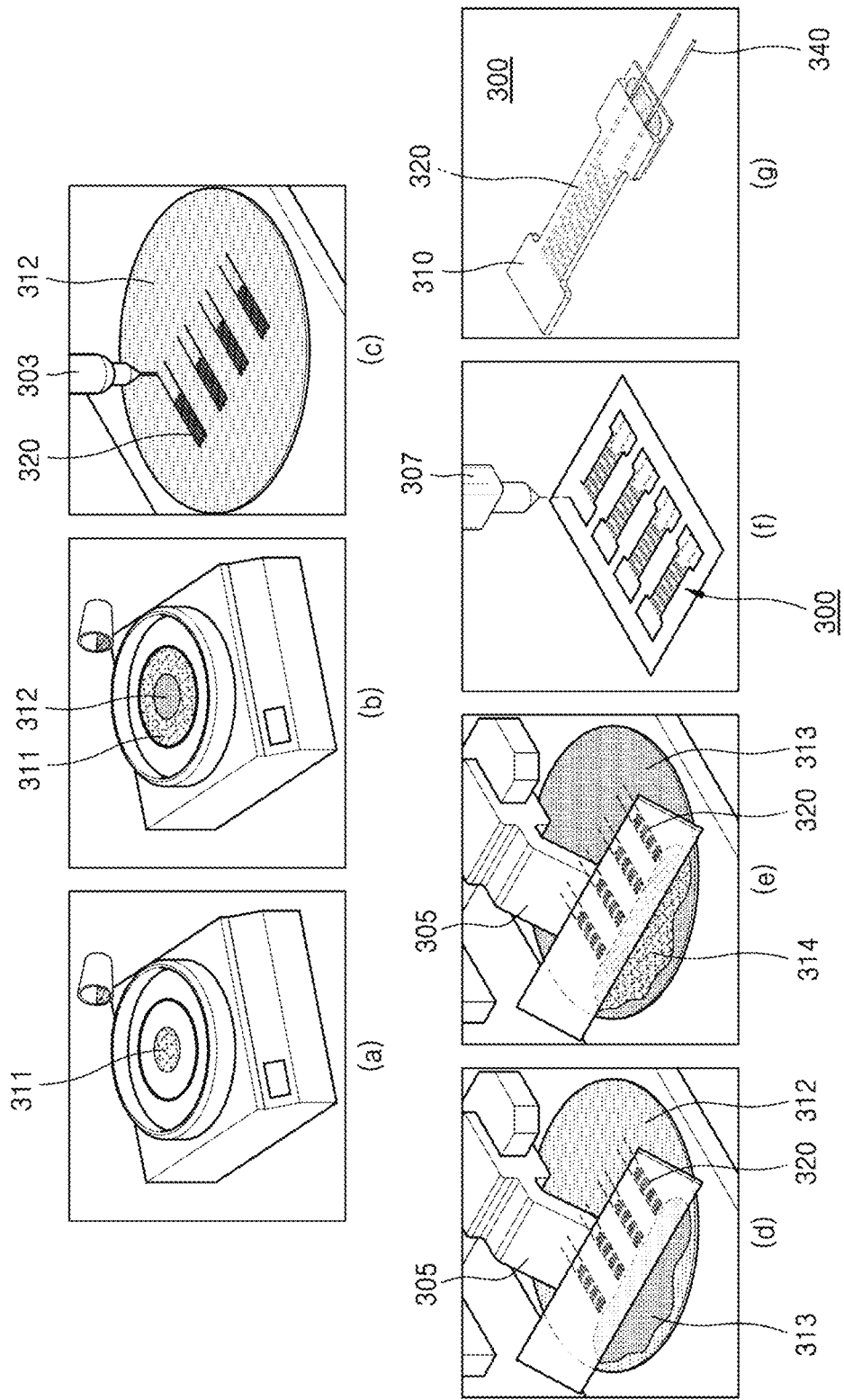
FIG. 10 is a diagram illustrating a method of manufacturing the soft sensor of FIG. 9.

FIG. 10 are diagrams illustrating a method of manufacturing the soft sensor of FIG. 9.

First, referring to FIG. 10A, the first elastic layer 311 may be formed by coating a first elastic material on a base substrate. Herein, the first elastic layer 311 may be formed by using the first elastic layer having relatively high elasticity. Although the drawing illustrates that the first elastic layer 311 is formed by spin coating, the inventive concept is not limited thereto. The first elastic layer 311 may be formed by various methods such as silicon coating or printing.

Next, referring to FIG. 10B, the second elastic layer 312 is formed by spin coating a second elastic material on the first elastic layer 311. Herein, the second elastic layer 312 may be formed by using the second elastic material having a relatively high hardness. Although the drawing illustrates that the second elastic layer 312 is formed by spin coating, the inventive concept is not limited thereto. The second elastic layer 312 may be formed by various methods such as silicon coating or printing.

Then, referring to FIG. 10C, a sensor unit 320 is formed by printing a conductive liquid metal on the second elastic layer 312 by using a nozzle 303. Herein, the EGaIn, which is the conductive liquid metal, may be used in the nozzle 303. The nozzle 303 may be coupled to a CNC equipment and may be controlled to be movable in directions of three axes. The CNC equipment may be a 3D printer and may include a three-axis controller, an injecting controller, a microscope, or the like. The nozzle 303 may print the conductive liquid metal while moving in a predetermined path by a control of the three-axis controller. Paths in the directions of three axes may be respectively set according to the channel patterns.

Next, referring to FIG. 10D, a third elastic layer 313 is formed by coating the second elastic material on the second elastic layer 312 on which the sensor unit 320 is formed. Herein, the third elastic layer 313 may be formed by using the second elastic material having a relatively high hardness. Although the drawing illustrates that the third elastic layer 313 is formed by silicon coating, the inventive concept is not limited thereto. The third elastic layer 313 may be formed by using various methods such as spin coating or printing, or the like.

The sensor unit 320 has a very large surface tension as the conductive liquid metal maintains in a liquid state. Therefore, even when the second elastic material is coated on the sensor unit 320 in the liquid state, the second elastic material and the conductive liquid metal are not mixed. Accordingly, the channel pattern of the sensor unit 320 is maintained and covered with the second elastic material.

Next, referring to FIG. 10E, the fourth elastic layer 314 is formed by coating the first elastic material on the third elastic layer 313. Herein, the fourth elastic layer 314 may be formed by using the first elastic material having relatively high elasticity. Although the drawing illustrates that the fourth elastic layer 314 is formed by silicon coating, the inventive concept is not limited thereto. The fourth elastic layer 314 may be formed by using various methods such as spin coating or printing, or the like.

Next, referring to FIG. 10F, when the fourth elastic layer is hardened, the fourth elastic layer is cut into a desired shape by using laser cutting. Although FIG. 10 illustrates that the shape of the elastic sheet 310 is simplified, as shown in FIG. 3, after forming the elastic sheet (see 110 of FIG. 3(5?)) including the sensor unit (see 120 of FIG. 3(5?)), the elastic sheet may be cut into a shape of a hand or glove by using a method such as laser cutting.

Finally, the elastic sheet may be removed from the base substrate 301 to complete a soft sensor and a hand-wearable device having the soft sensor, as shown in FIG. 10G.

Figure 11:
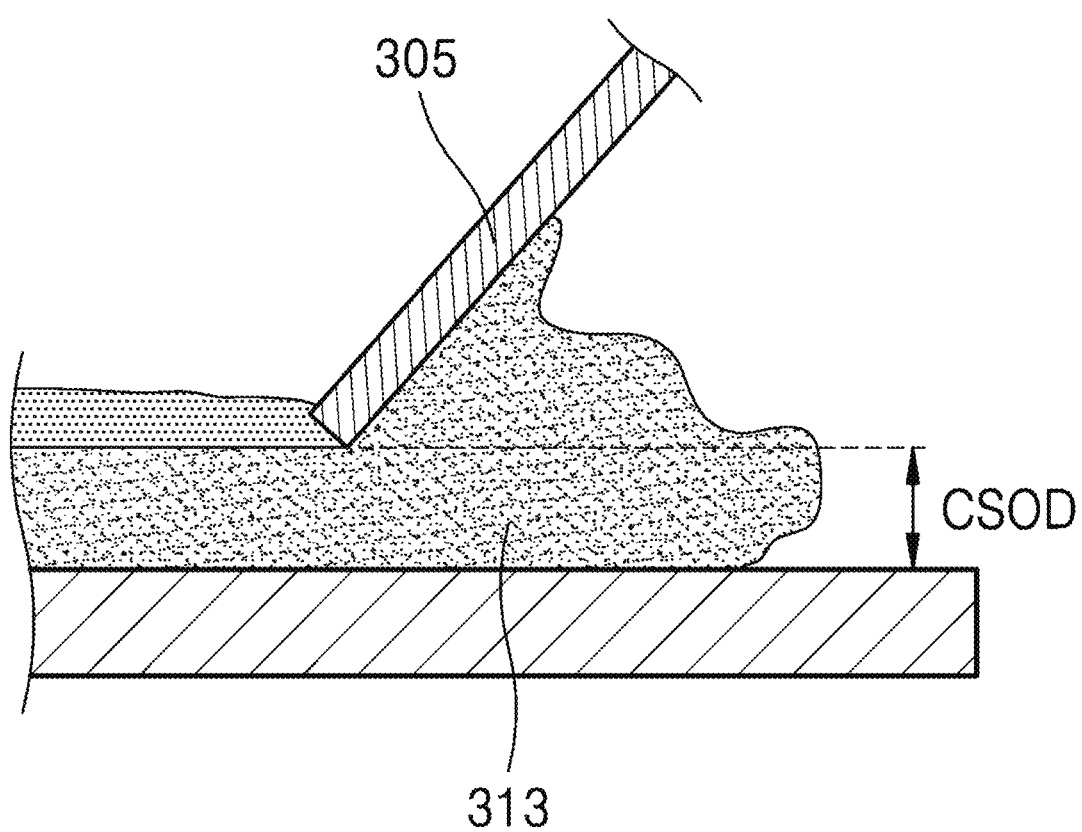
FIG. 11 is a diagram illustrating a thickness of a silicon layer in the method of manufacturing the soft sensor of FIG. 10.

FIG. 11 is a diagram illustrating a thickness of a silicon layer in the method of manufacturing the soft sensor of FIG. 10.

As described above, the performance of the soft sensor may vary depending on the process condition in the process of manufacturing the soft sensor by using the silicon material. For example, the viscosity of the silicon material, a rotation speed when spin-coating the silicon material, and a height of a silicon-coated plate affect the thickness of the soft sensor and the thickness of the soft sensor will soon affect the performance of the soft sensor described above.

The thickness of the silicon layer formed by spin coating is inversely proportional to the rotation speed of the spin coating and proportional to the viscosity of the silicon material. Accordingly, the performance of the sensor may be adjusted by adjusting the speed of spin coating to adjust the thickness of the silicon layer.

In addition, as shown in FIG. 8, although the thickness of the silicon layer formed by silicon coating has a value close to a covering stand-off distance (CSOD), an error of a certain tendency may occur depending on the viscosity of the silicon material. For example, when the viscosity of the silicon material is very low, the thickness of the silicon layer may be less than the CSOD due to an effect of spreading before the silicon solidifies.

The hand-wearable device (see 400 of FIG. 7) according to an embodiment may also be expressed as a finger movement measuring device measuring a movement of a finger in another aspect. Hereinafter, in terms of the finger movement measuring device, a measuring principle thereof is described.

FIGS. 12A to 12E are perspective views of measuring principles of the soft sensor in the finger movement measuring device of FIG. 7.

Figure 12:
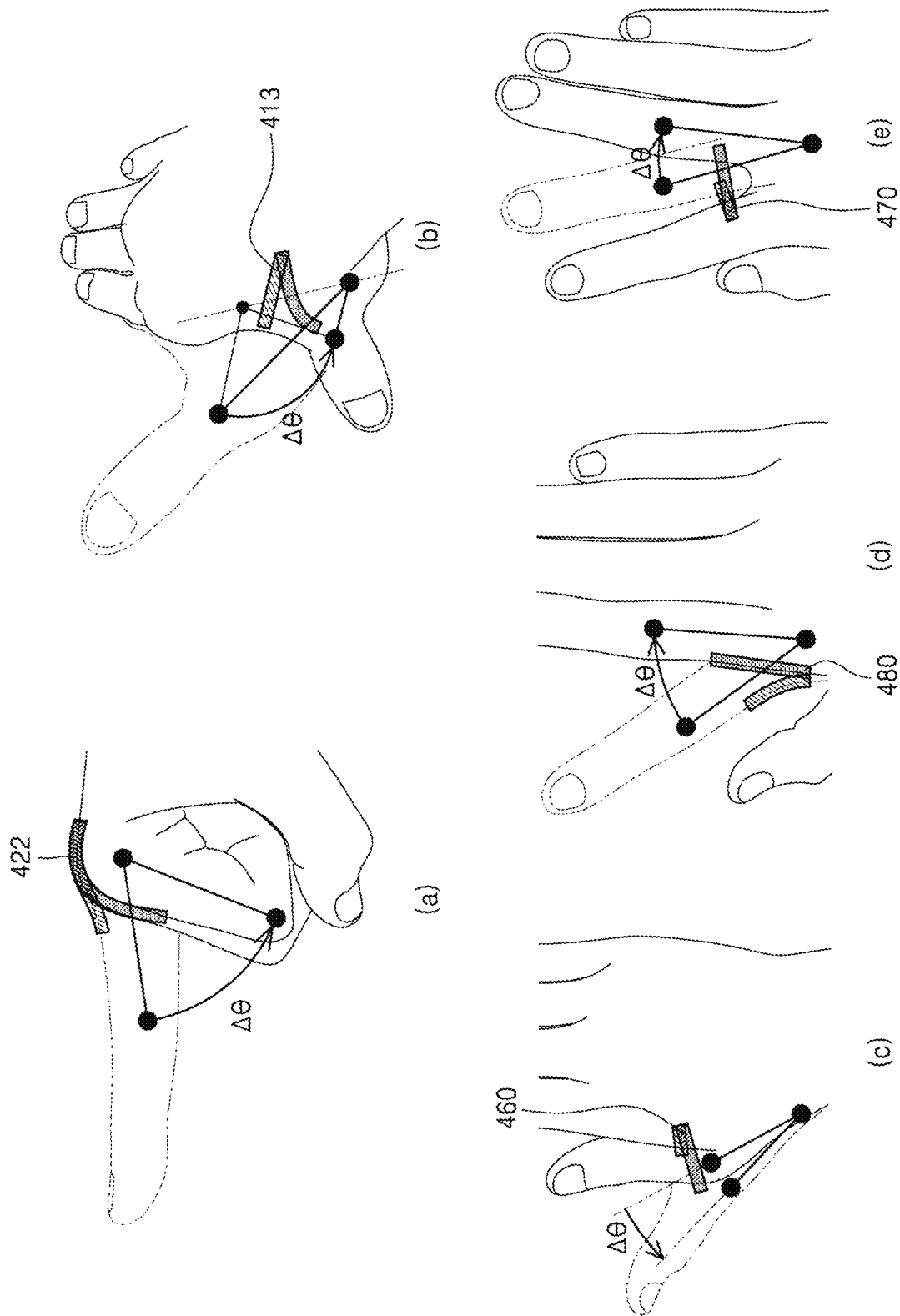
FIG. 12 illustrates perspective views showing the measuring principle of the soft sensor in the hand-wearable device of FIG. 7.

FIG. 12A illustrates that a second index finger portion sensor 422 of the index finger sensing unit 420 measures the bending and stretching between the proximal phalanx and metacarpals of the index finger. In other words, when the index finger is bent like a solid line and when the index finger stretches like a dotted line, a length of the second index finger portion sensor 422 is changed, and thus, a strain $\varepsilon$ is calculated by using a resistance change $\Delta R$ according to a change in length of the soft sensor and the bending and stretching may be measured by using the strain $\varepsilon$.

In the present disclosure, a first thumb portion sensor 411 and a second thumb portion sensor 412 of a thumb sensing unit 410, a first index finger portion sensor 421 and the second index finger portion sensor 422 an index finger sensing unit 420, and a first middle finger portion sensor 431 and a second middle finger portion sensor 432 of the middle finger sensing unit 430 which measure the bending and stretching use the same principle.

FIG. 12B illustrates that a third thumb portion sensor 413 of the thumb sensing unit 410 measures the bending and stretching between the metacarpals and carpals of the thumb. In other words, when the thumb faces down as in the solid line and when the thumb faces up as in the dotted line, a length of the third thumb portion sensor 413 is changed, and thus, a strain $\varepsilon$ is calculated by using a resistance change $\Delta R$ according to a change in length of the soft sensor and the bending and stretching may be measured by using the strain $\varepsilon$.

FIG. 12C illustrates that a first adduction/abduction measuring sensor 460 forms between the thumb and a back of a hand and measures the adduction and abduction of the thumb. In other words, when the thumb is close to the back of the hand as in the solid line and when the thumb is far from the back of the hand as in the dotted line, a length of the first adduction/abduction measuring sensor 460 is changed, and thus, a strain $\varepsilon$ is calculated by using a resistance change $\Delta R$ according to a change in length of the soft sensor and the adduction and abduction may be measured by using the strain $\varepsilon$.

FIG. 12D illustrates that a third adduction/abduction measuring sensor 480 forms on a side of the index finger and measures the adduction and abduction of the index finger. In other words, when the index finger is close to the middle finger as in the solid line and when the index finger is far from the middle finger as in the dotted line, a length of the third adduction/abduction measuring sensor 480 is changed, and thus, a strain $\varepsilon$ is calculated by using a resistance change $\Delta R$ according to a change in length of the soft sensor and the adduction and abduction may be measured by using the strain $\varepsilon$.

FIG. 12E illustrates that a second adduction/abduction measuring sensor 470 forms between the index finger and the middle finger and measures the adduction and abduction of the middle finger. In other words, when the middle finger is close to the ring finger as in the solid line and when the middle finger is far from the ring finger as in the dotted line, a length of the second adduction/abduction measuring sensor 470 is changed, and thus, a strain $\varepsilon$ is calculated by using a resistance change $\Delta R$ according to a change in length of the soft sensor and the adduction and abduction may be measured by using the strain $\varepsilon$.

The particular implementations shown and described herein are illustrative examples of the inventive concept and are not intended to otherwise limit the scope of the inventive concept in any way. For the sake of brevity, conventional electronics, control systems, software development and other functional aspects of the systems may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the inventive concept unless the element is specifically described as "essential" or "critical".

The use of the terms "a" and "an" and "the" and similar referents in the context of describing the inventive concept (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Also, the steps of all methods described herein can be performed in any suitable order unless otherwise indicated herein or otherwise clearly contradicted by context. The inventive concept is not limited to the described order of the steps. The use of any and all examples, or exemplary language (e.g., "such as") provided herein, is intended merely to better illuminate the inventive concept and does not pose a limitation on the scope of the inventive concept unless otherwise claimed. Numerous modifications and adaptations will be readily apparent to one of ordinary skill in the art without departing from the spirit and scope.

Embodiments according to the present disclosure described above may be implemented in a form of a computer program that may be executed through various components on a computer, and the computer program may be recorded on a computer-readable medium. The medium may be to continue storing the computer-executable program, or to store for execution or download. In addition, the medium may be carious recording units or storage units in a form of a single or several hardware combined, which is not limited to a medium directly connected to any computer system, but may be distributed on a network. Examples of the medium include magnetic storage media such as hard disks, floppy disks, and magnetic tapes, optical recording media such as CD-ROMs and DVDs, magneto-optical medium such as floptical disk, a medium including a program configured to store program instructions, including a ROM, a RAM, a flash memory, or the like. As another example of the medium, recording media or storage media managed by an app store that distributes applications, a site that supplies or distributes various software, a server, or the like may be used.

While the inventive concept has been particularly shown and described with reference to exemplary embodiments thereof, it will be understood by those of ordinary skill in the art that various changes in form and details may be made therein without departing from the spirit and scope as defined by the following claims.

Therefore, the scope of the inventive concept is defined not by the detailed description of the inventive concept but by the appended claims, and all differences within the scope will be construed as being included in the inventive concept.

INDUSTRIAL APPLICABILITY

The present disclosure provides a soft sensor and a method of manufacturing the same, a hand-wearable device having the soft sensor, and a method of manufacturing the hand-wearable device.

The invention claimed is:

1. A soft sensor comprising:
a first elastic layer;
a sensor unit formed by three-dimensional (3D) printing a conductive liquid metal including eutectic gallium-indium alloy (EGaIn), on an upper side of the first elastic layer; and
a second elastic layer formed to cover the first elastic layer and the sensor unit, on the upper side of the first elastic layer and an upper side of the sensor unit,
wherein the conductive liquid metal retains a liquid state thereof at room temperature and has conductivity,
a surface tension of the second elastic layer is smaller than a surface tension of the sensor unit,
the sensor unit retains a liquid state between the first elastic layer and the second elastic layer even after the second elastic layer is formed, and
a shape, a size, and a performance of the sensor unit are adjusted depending on a combination of an inner diameter of a nozzle, an injecting pressure of the nozzle, a distance between the nozzle and the upper surface of the first elastic layer, and a transportation rate of the nozzle.

2. The soft sensor of claim 1, further comprising a connection unit formed on at least one end of the sensor unit.

3. The soft sensor of claim 2, further comprising a wire unit electrically connected to the outside, wherein the connection unit connects the sensor unit to the wire unit.

4. The soft sensor of claim 1, wherein the elastic sheet is formed by mixing a first elastic material having a first hardness and a second elastic material having a second hardness.

5. A hand-wearable device comprising:
at least one soft sensor of claim 1,
wherein the hand-wearable device has a shape corresponding to at least a portion of a shape of a hand, and
the at least one soft sensor is located at a position corresponding to at least some joints of the hand.

6. The hand-wearable device of claim 5, wherein the at least one soft sensor is formed on a joint portion of a finger and is a sensor measuring the bending and stretching of the finger.

7. The hand-wearable device of claim 5, wherein the at least one soft sensor is formed between fingers adjacent to each other and is an adduction/abduction measuring sensor measuring the adduction and abduction of at least some of the two fingers.

8. The hand-wearable device of claim 5, wherein the hand-wearable device is formed by cutting, into a shape for a worn portion, a remaining portion of the elastic sheet except for a portion in which the soft sensors are formed.

* * * * *